United States Patent
Kontani (12) 
(10) Patent No.: US 6,333,475 B1
(45) Date of Patent: Dec. 25, 2001

(54) LEVER SWITCH, COMPOUND SWITCH HAVING THE LEVER SWITCH, AND VEHICLE USING THE LEVER SWITCH

(75) Inventor: Masaki Kontani, Fukui (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/637,572

(22) Filed: Aug. 14, 2000

(30) Foreign Application Priority Data

Feb. 17, 2000 (JP) ................................................ 12-039556

(51) Int. Cl.[7] .................................................. H01H 25/00
(52) U.S. Cl. .................. 200/61.34; 200/61.3; 200/61.35
(58) Field of Search ............................... 200/4, 17 R, 18, 200/61.27, 61.3, 61.31, 61.34, 61.35, 61.36, 61.54, 332, 335

(56) References Cited

U.S. PATENT DOCUMENTS

| | | | |
|---|---|---|---|
| 4,281,232 | | 7/1981 | Hirai et al. ............................ 200/315 |
| 4,767,895 | | 8/1988 | Parrish ................................ 200/43.04 |
| 5,120,914 | * | 6/1992 | Kerner et al. ....................... 200/61.54 |
| 5,196,662 | * | 3/1993 | Hofmann ............................ 200/61.54 |
| 5,652,417 | * | 7/1997 | Tsai et al. ............................. 200/6 R |
| 5,760,355 | * | 6/1998 | Glowczewski et al. ........... 200/61.54 |
| 5,900,601 | * | 5/1999 | Uchiyama .......................... 200/61.27 |
| 5,949,040 | * | 9/1999 | Hayakawa et al. ................ 200/61.34 |
| 6,194,676 | * | 2/2001 | Takahashi et al. ................. 200/61.34 |

\* cited by examiner

Primary Examiner—Michael Friedhofer
(74) Attorney, Agent, or Firm—McDermott, Will & Emery (57) ABSTRACT

The operation is silent when manipulating the lever switch. Further, a lever switch having a favorable sensation of manipulation is obtained. The lever switch includes a sliding element, an operation lever, a moderator pin, a moderator plate, and a switch contact point. The moderator plate is disposed at a position where the leading end of the moderator pin elastically contacts with the moderator plate. The moderator plate has a moderation ditch in a concave shape, moderation protrusions positioned at both ends of the moderation ditch, and a sliding surface linking the moderation ditch and moderation protrusions. The sliding surface has a thin portion so as to be deflected by pressure of the moderator pin. When the operation lever is manipulated, while the sliding element is rotating, the moderator pin slides on the surface of the moderation protrusions, sliding surface, and moderation ditch, the sliding surface is deflected by the pressure of the moderator pin, and at the same time, the switch contact point opens or closes electrically depending on the rotation of the sliding element. The compound switch has a plurality of lever switches, and each lever switch of the plurality of lever switches is the lever switch as described above. Such lever switches are used in a vehicle.

24 Claims, 12 Drawing Sheets

PRIOR ART

Fig. 10

PRIOR ART

Fig. 11

PRIOR ART

Fig. 12

PRIOR ART

LEVER SWITCH, COMPOUND SWITCH HAVING THE LEVER SWITCH, AND VEHICLE USING THE LEVER SWITCH

FIELD OF THE INVENTION

The present invention relates to a lever switch, and more particularly to a lever switch for a vehicle disposed near the steering wheel of an automobile, a compound switch having such lever, and a vehicle using such lever switch.

BACKGROUND OF THE INVENTION

A lever switch for vehicle is generally disposed near the steering wheel of an automobile. The lever switch is used for the purpose of changing over the function of headlights, turn signal for direction indication, wiper motor for operating wipers of windshield and rear window, and washer motor for ejecting washer liquid to the windowpane.

A conventional lever switch is explained by referring to FIG. 9 to FIG. 12.

Figure 9:
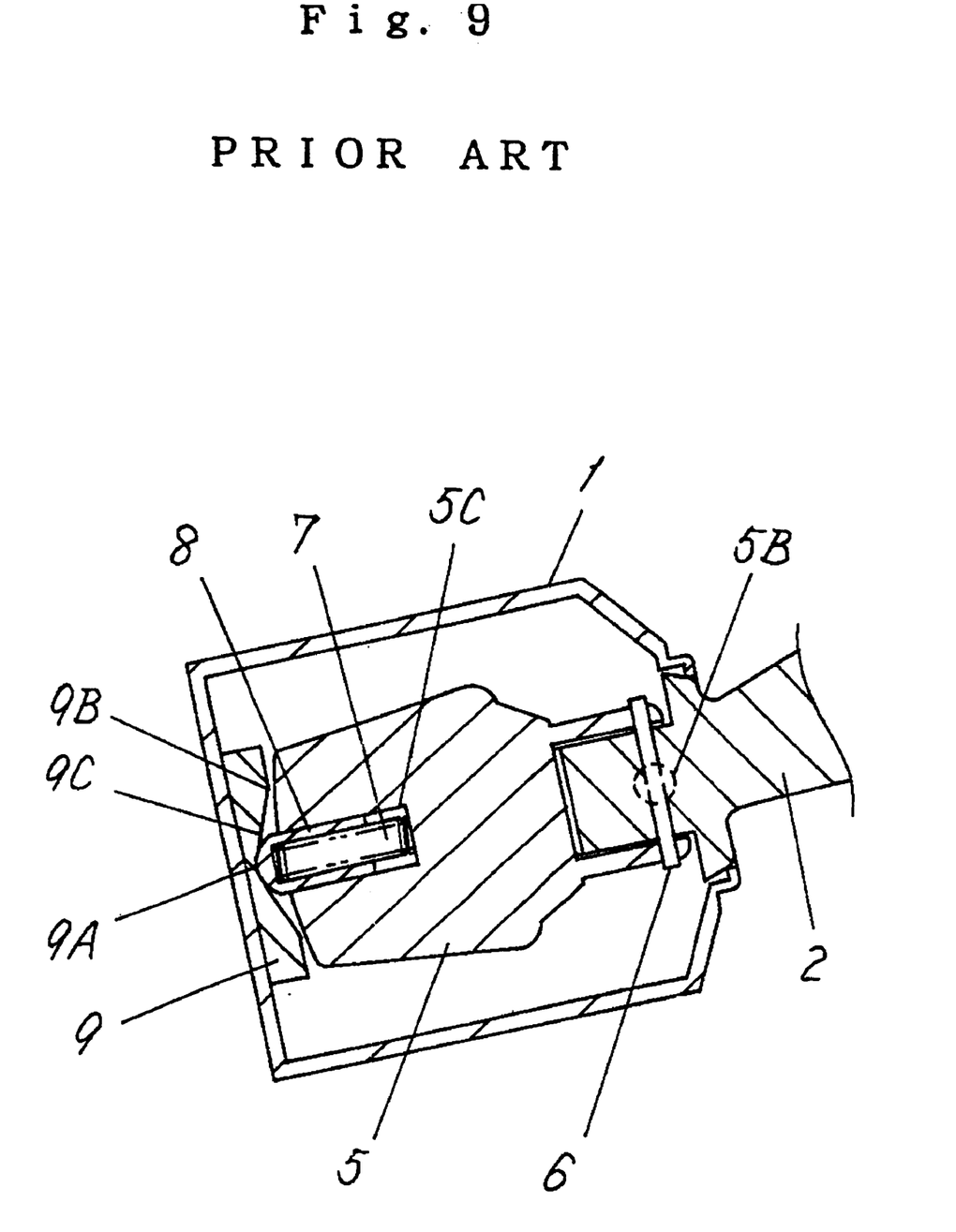
FIG. 9 is a plan sectional view of a conventional lever switch.
Figure 10:
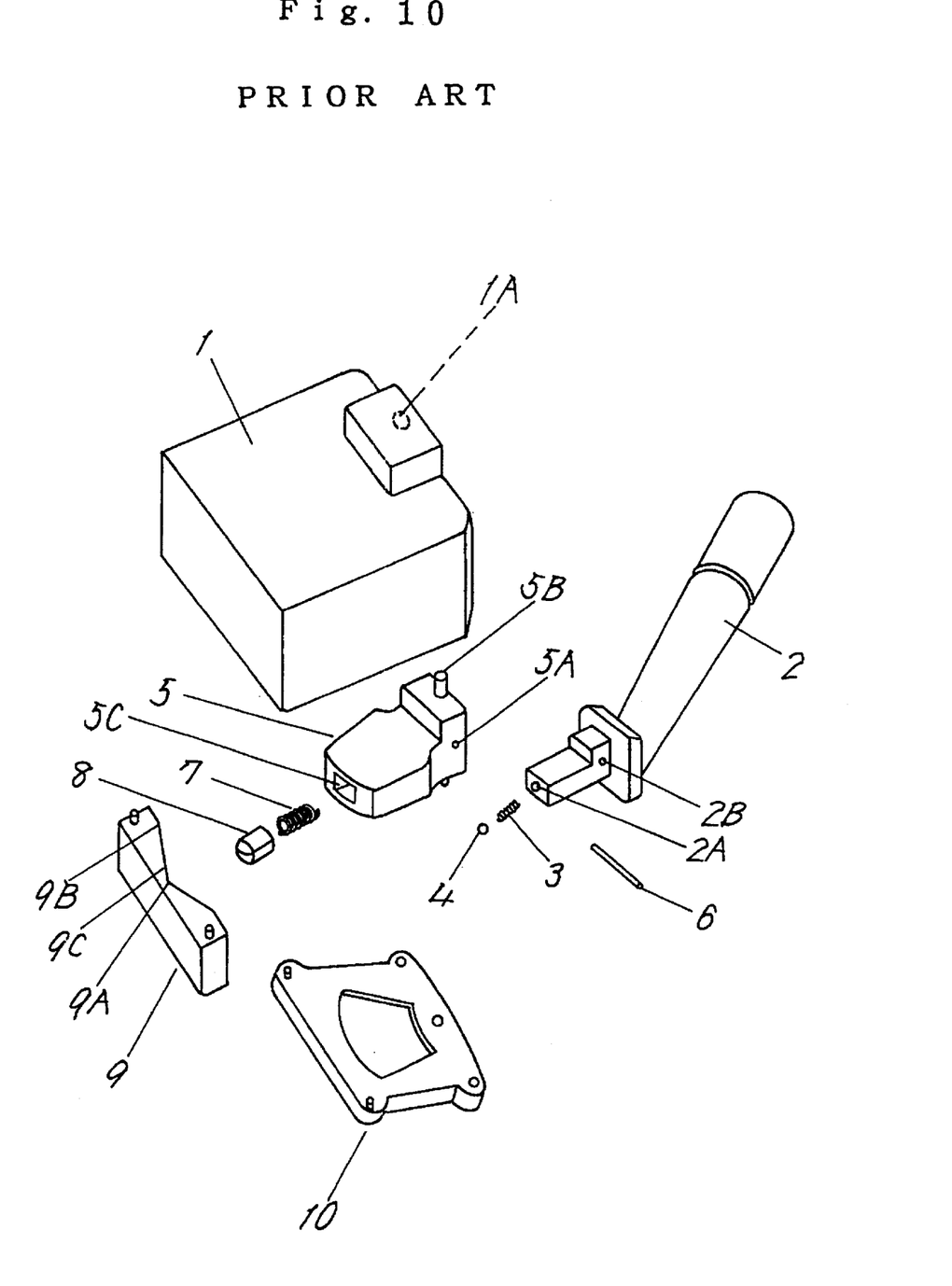
FIG. 10 is a perspective exploded view of the conventional lever switch.
Figure 11:
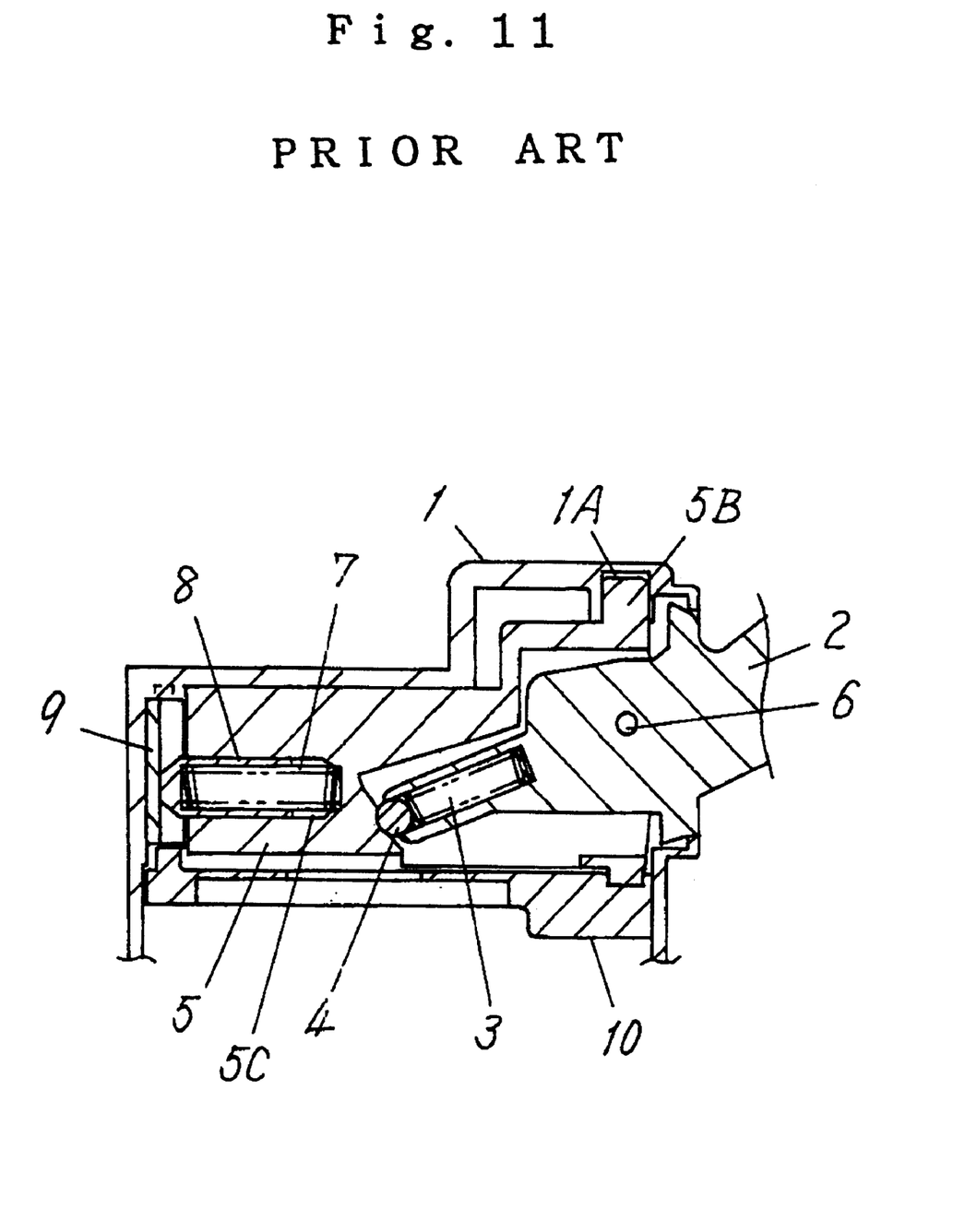
FIG. 11 is a side sectional view of the conventional lever switch.

FIG. 9 is a plan sectional view of a conventional lever switch. FIG. 10 is a perspective exploded view of the lever switch shown in FIG. 9. FIG. 11 is a side sectional view of the lever switch shown in FIG. 9. In FIG. 9 to FIG. 11, the lever switch has a case 1 and a lever switch 2. The case 1 is a box, with an opening formed at the right side, and is made of polyacetal or other resin. An operation lever 2 protrudes from the opening of the case 1. A coil spring 3 and a ball 4 are contained in a hole 2A at the leading end of the root side of the operation lever 2. A through-hole 2B is formed at both sides of the lever switch 2. A through-hole 5A is formed at the side of a sliding element 5. A shaft 6 is inserted in the through-hole 2B and through-hole 5A, and the operation lever 2 is rotatably provided at the right end of the sliding element 5.

A shaft portion 5B of the sliding element 5 is inserted into a support hole 1A, and is rotatably accommodated in the case 1. A moderator pin 8 being thrust to a coil spring 7 in a relatively deflected state is put in a hole 5C at the left end of the sliding element 5.

A moderator plate 9 is formed of a resin of low hardness such as elastomer. This moderator plate 9 comprises a moderation ditch 9A in a concave shape formed in the center, moderation protrusions 9B formed at both ends, and a sliding surface 9C linking them in an inclination. The moderator plate 9 is held and fixed at the left inner side wall of the case 1. The leading end of the moderator pin 8 elastically contacts with the moderation ditch 9A.

A cover 10 covers the lower side opening of the case 1. Beneath the cover 10, there is a switch contact point (not shown) for electrically opening and closing by the rotation of the sliding element 5. The lever switch is composed in this structure.

Figure 12:
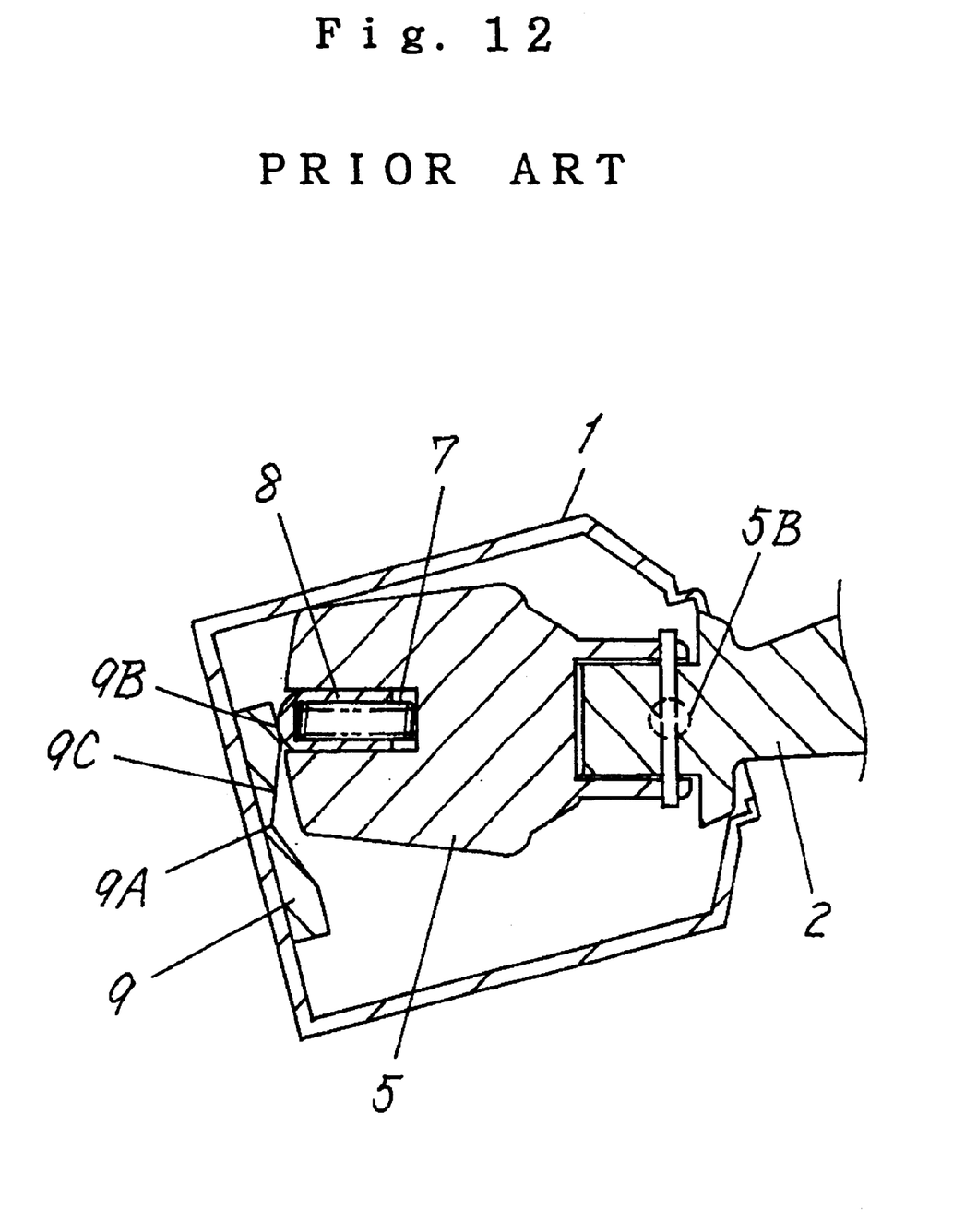
FIG. 12 is a plan sectional view in operation of the conventional lever switch.

In this structure, in FIG. 9, the operation lever 2 is located at the neutral position. When the operation lever 2 is manipulated in the lower direction from the neutral position, as shown in FIG. 12, the sliding element 5 rotates in the upper direction from the fulcrum of the shaft portion 5B supported on the case 1. Accordingly, the moderator pin 8 being thrust to the coil spring 7 departs from the moderation ditch 9A of the moderator plate 9, and elastically slides on the sliding surface 9C.

Where the sliding element 5 contacts with the upper inner side wall of the case 1, the moderator pin 8 elastically slides from the sliding surface 9C to the moderation protrusion 9B. At this time, the deflection amount of the coil spring 7 changes. As a result, the operator feels a moderate sensation of manipulation from the operator lever 2. By such rotation of the sliding element 5, the switch contact point at the lower position is opened and closed electrically.

When the operation lever 2 is returned from the lower position to the neutral position, or when the operation lever 2 is manipulated in the upper direction from the neutral position, similarly, the moderator pin 8 slides elastically on the moderation ditch 9A, sliding surface 9C, and moderation protrusions 9B of the moderator plate 9. As the deflection amount of the coil spring 7 changes at these positions, a moderate sensation at each position is obtained.

From the fulcrum of the through-hole 2B in which the shaft 6 is inserted, the operation lever 2 can be manipulated in both forward and backward directions. In this case, the ball 4 being thrust to the coil spring 3 contained in the hole 2A of the operation lever 2 elastically contacts with the sliding element 5. As a result, a moderate sensation of manipulation is obtained, and by rotation of the operation lever 2, the switch contact point at the lower position is opened and closed electrically.

In the conventional lever switch, however, when the sliding element 5 is rotated by manipulation of the operation lever 2, in particular, the operation lever 2 returns from the upper or lower direction to the neutral position, and the moderator pin 8 departs from the sliding surface 9C of the moderator plate 9 and elastically contacts with the moderation ditch 9A, and at this time, as the moderator pin 8 hits against the moderation ditch 9A, a collision sound is generated due to inertia of the coil spring 7 inclined to elongate, or rattling of moderator pin 8 or coil spring 7 in the hole 5C of the sliding element 5.

It is hence an object of the invention to present a lever switch operating silently, with a favorable sensation of manipulation, by lowering the collision sound occurring when manipulating the lever switch, and a compound switch using the same.

SUMMARY OF THE INVENTION

A lever switch of the invention comprises:

a case having an opening and an inner wall, a sliding element rotatably provided in the case, an operation lever coupled to the sliding element, and protruding from the opening, a moderator pin disposed in the hole of the sliding element, a moderator plate disposed in the case, and a switch contact point, in which the moderator plate is disposed at a position where the leading end of the moderator pin elastically contacts with the moderator plate, the moderator plate has a moderation ditch in a concave shape, moderation protrusions positioned at both ends of the moderation ditch, and a sliding surface linking the moderation ditch and moderation protrusions, the sliding surface has a thin portion so as to be deflected by pressure of the moderator pin, when the operation lever is manipulated, while the sliding element is rotating, the moderator pin slides on the surface of the moderation protrusions, sliding surface, and moderation ditch, the sliding surface is deflected by the pressure of the moderator pin, and at the same time, the switch contact point opens or closes electrically depending on the rotation of the sliding element.

A compound switch of the invention has a plurality of lever switches, and each lever switch of the plurality of lever switches has the above lever switch.

A vehicle of the invention comprises:

a steering wheel having a shaft, a housing disposed at the outer side of the shaft, and a plurality of lever switches disposed protruding from the housing, in which each lever switch of the plurality of lever switches has the above lever switch.

In this structure, the lever switch manipulation is silent. Further, a lever switch of an excellent manipulation sensation is obtained.

REFERENCE NUMERALS

1 Case
1A Support hole
2 Operation lever
2A Hole
2B Through-hole
3 Coil spring
4 Ball
5 Sliding element
5A Through-hole
5B Shaft portion
5C Hole
6 Shaft
7 Coil spring
8 Moderator pin
10 Cover
13, 14, 15, 16 Moderator plate
13A, 14A, 16A Moderation ditch
13B, 16B Moderation protrusion
13C, 14C, 15C, 16C Sliding surface
15D Rib
20 Housing
20A Opening
21, 22 Lever switch
21A, 22A Operation lever
23, 24 Rotary switch
30 Switch contact point
31, 32 Gap
35 Space

DETAILED DESCRIPTION OF THE INVENTION

The lever switch of the invention comprises a box-shaped case, an operation lever, a sliding element, a moderator pin, a moderator plate, and a switch contact point. The moderator plate has a sliding surface disposed between a moderation ditch and moderation protrusions, and the sliding surface is thin and flexible. The moderation ditch and moderation protrusions are linked by the sliding surface. The moderator plate has a nearly M-shape. The moderator pin elastically contacts with the moderator plate.

In this structure, the operation noise is suppressed, and a lever switch with a favorable sensation of manipulation is obtained.

The lever switch in an embodiment of the invention comprises a box-shaped case, an operation lever, a sliding element, a moderator pin, a moderator plate, and a switch contact point. The box-shaped case has an opening at its side. The sliding element is rotatably contained in the case. The operation lever is attached to one end of the sliding element, and protrudes from the case opening. The moderator pin is contained in the hole at other end of the sliding element, together with a spring in a relatively deflected state. The moderator plate has a concave moderation ditch formed in the center, moderation protrusions formed at both ends, and a sliding surface for linking between them. The moderator plate is held in the inner side wall of the case, and has a nearly M-shape. The sliding surface has a thin portion so as to be deflected by the pressure of the moderator pin. The moderation ditch elastically contacts with the leading end of the moderator pin. The sliding surface is thin and flexible. The switch contact point opens and closes electrically by rotation of the sliding element.

Since the sliding surface of the moderator plate is thin and flexible, as the moderator pin elastically slides in a relatively deflected state, collision of the moderator pin into the moderation ditch is relaxed, and collision sound in manipulation is suppressed, and silent operation is realized. Further, a favorable sensation of manipulation is obtained.

Preferably, a predetermined gap is formed between the back side of the moderation ditch of the moderator plate and the case inner side wall. In this structure, in the moderation ditch, aside from the sliding surface, the moderator pin is deflected by the portion of the predetermined gap between the moderation ditch and case inner side wall. As a result, the collision of the moderator pin is relaxed. Further, the manipulation sound is lowered.

Preferably, a protruding rib is disposed at the back side of the sliding surface of the moderator plate, and a predetermined gap is provided between the protruding rib and the case inner side wall. By varying the height of the rib at the back side of the sliding surface, the deflection of the sliding surface due to elastic contact of the moderator pin is adjusted. Therefore, if the sliding surface is extremely thin, the stress resistance to deflection is improved, and a favorable sensation of manipulation is maintained.

A compound switch in other embodiment of the invention comprises a plurality of lever switches, and at least one of the plurality of lever switches has the above structure. Each lever switch is disposed radially from the center of rotation of the steering wheel of the vehicle. In this structure, the compound switch having multiple functions is obtained. Further, the compound switch is quiet in operation. Further, a favorable sensation of manipulation is obtained.

Lever switches in exemplary embodiments of the invention are explained below while referring to FIG. 1 to FIG. 8.

The same components as explained in the prior art are identified with same reference numerals, and detailed description is omitted.

Exemplary Embodiment 1

Figure 1:
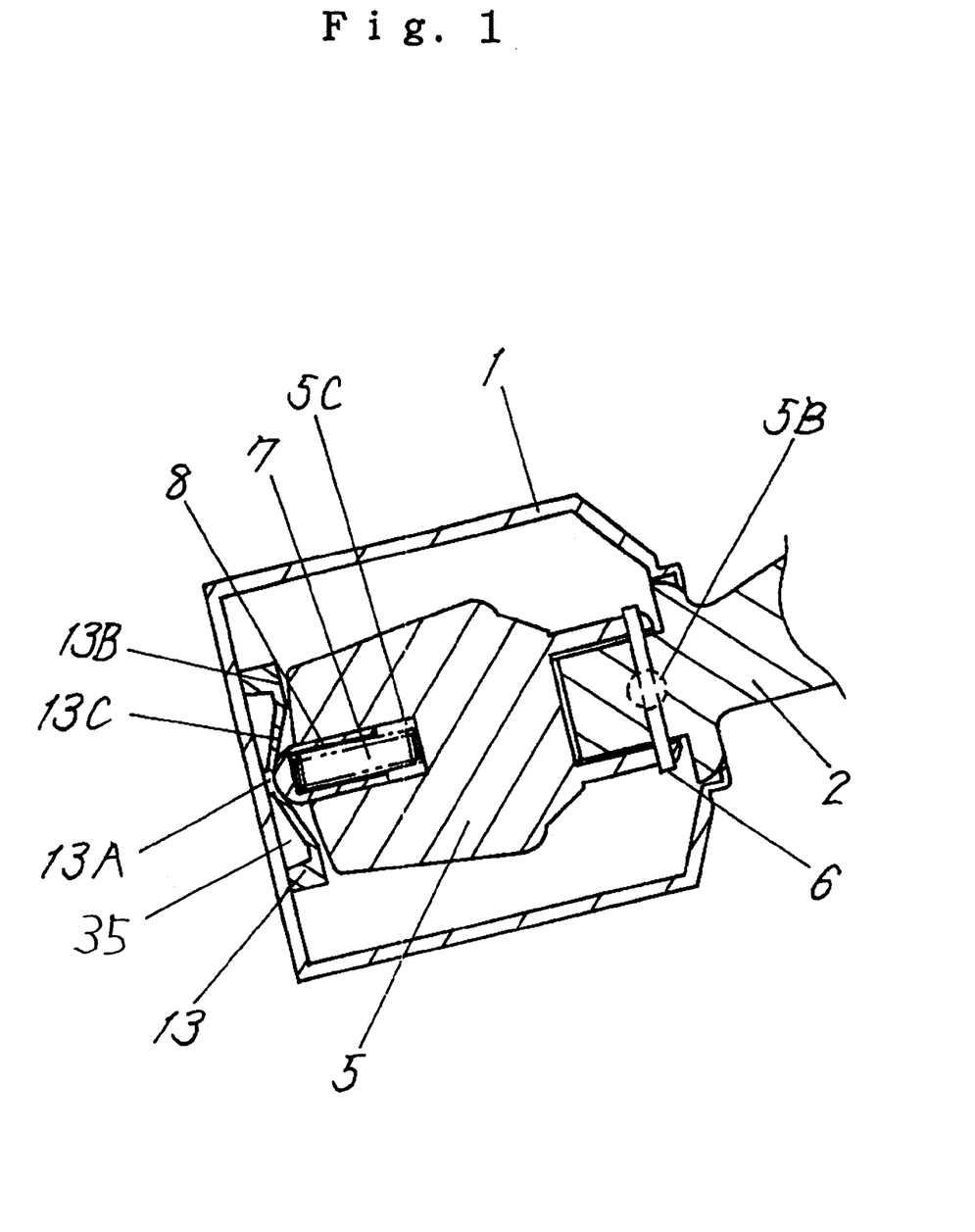
FIG. 1 is a plan sectional view of a lever switch in an embodiment of the invention.
Figure 2:
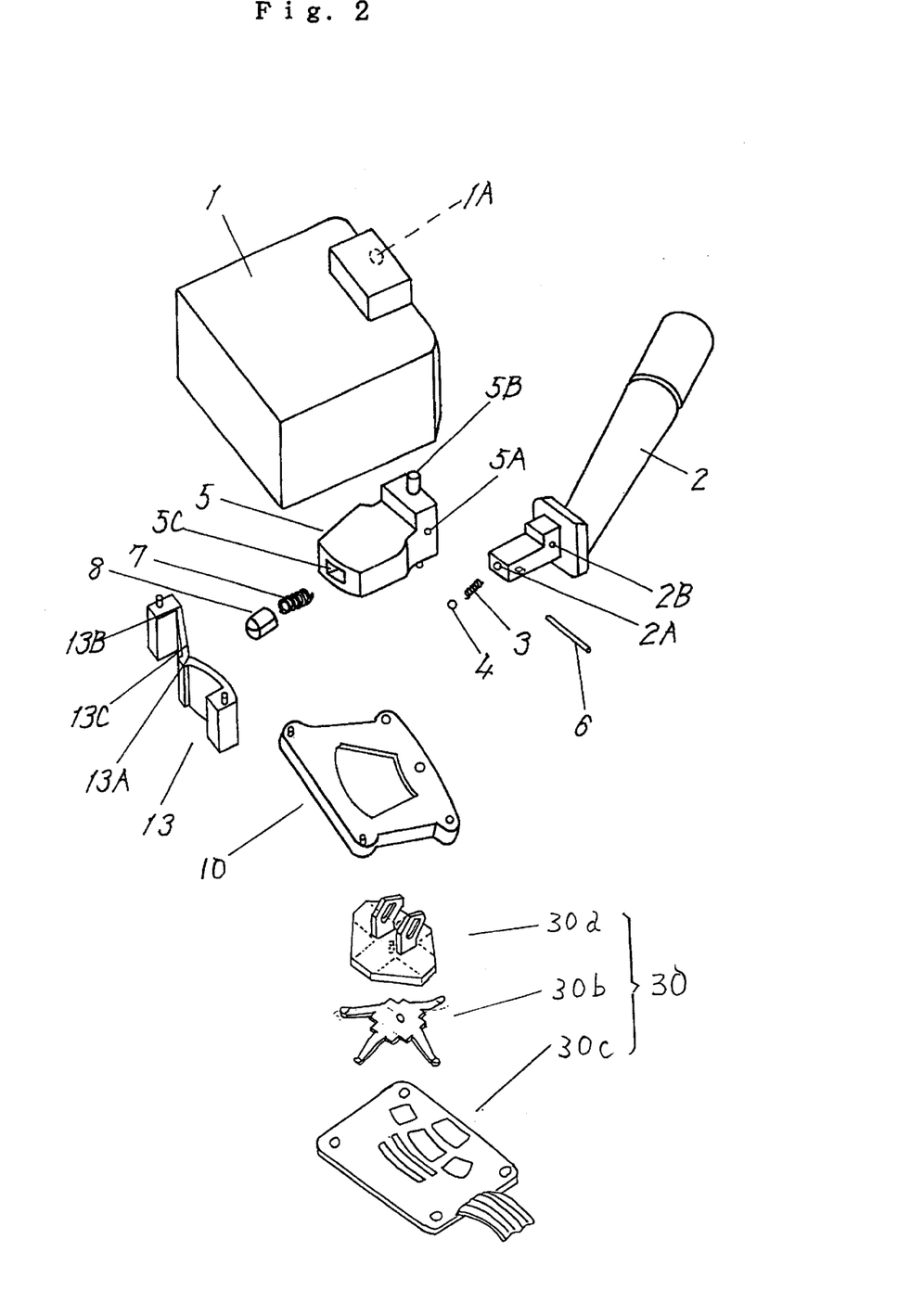
FIG. 2 is a perspective exploded view of the lever switch in the embodiment of the invention.
Figure 3:
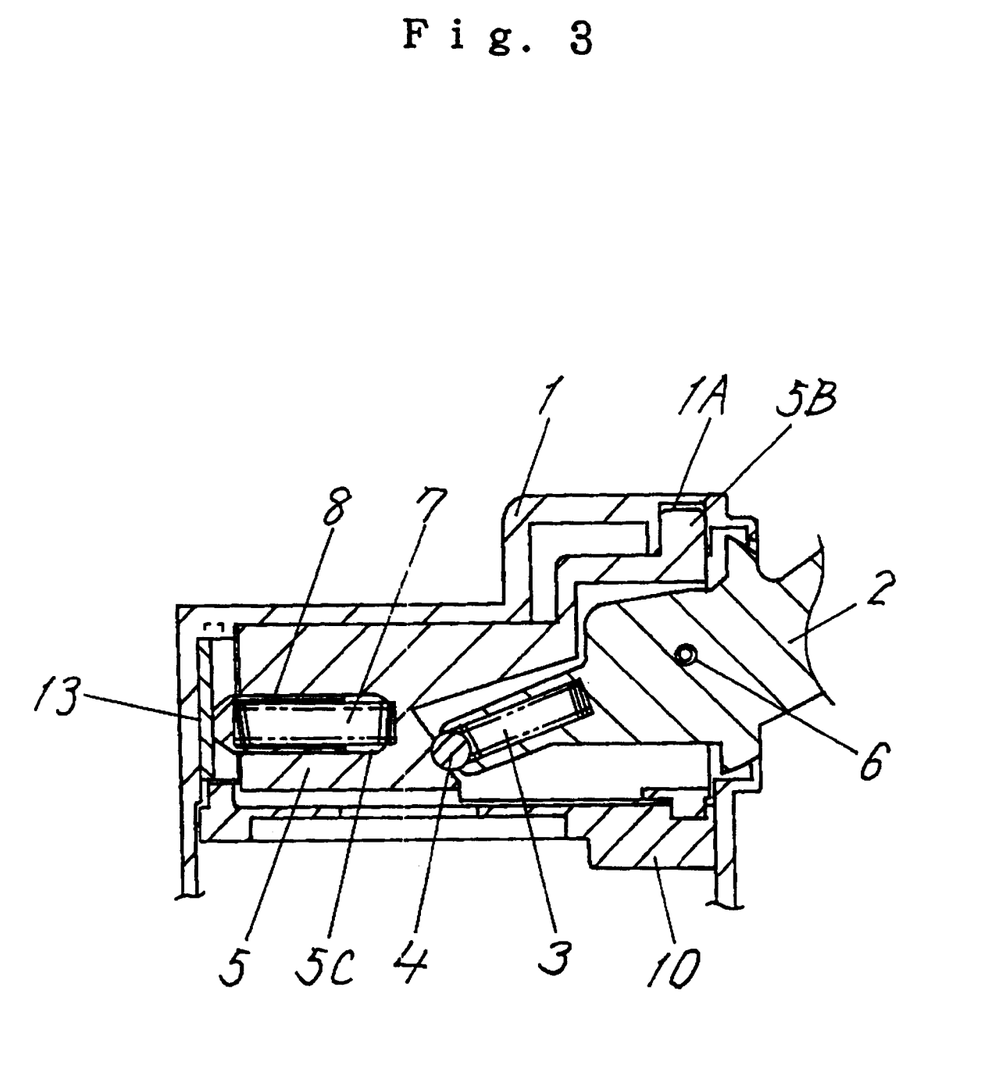
FIG. 3 is a side sectional view of the lever switch in the embodiment of the invention.

FIG. 1 is a plan sectional view of a lever switch in an embodiment of the invention. FIG. 2 is a perspective exploded view of the lever switch. FIG. 3 is a side sectional view of the lever switch. In FIG. 1 to FIG. 3, the lever switch comprises a case 1 and a lever switch 2. The case 1 is a box, with an opening formed at the right side, and is made of polyacetal or other resin. An operation lever 2 protrudes from the opening of the case 1. A coil spring 3 and a ball 4 are contained in a hole 2A at the leading end of the root side of the operation lever 2. A through-hole 2B is formed at both sides of the lever switch 2. A through-hole 5A is formed at the side of a sliding element 5. A shaft 6 is inserted in the through-hole 2B and through-hole 5A, and the operation lever 2 is rotatably provided at the right end of the sliding element 5.

A shaft portion 5B of the sliding element 5 is inserted into a support hole 1A, and the sliding element 5 is rotatably accommodated in the case 1. A moderator pin 8 being thrust to a coil spring 7 in a relatively deflected state is put in a hole 5C at the left end of the sliding element 5. The ball 4 is put in the hole 2A of the operation lever 2, and this ball 4 is thrust to the coil spring 3.

A moderator plate 13 is formed of a resin of low hardness such as elastomer. This moderator plate 13 comprises a moderation ditch 13A in a concave shape formed in the center, moderation protrusions 13B formed at both ends, and a sliding surface 13C linking them in an inclination. The moderator plate 13 is held and fixed at the left inner side wall of the case 1. The leading end of the moderator pin 8 elastically contacts with the moderation ditch 13A. A space 35 is formed at the back side of the sliding surface. The sliding surface 13C is thin and flexible. The sliding surface has a thin portion so as to be deflected toward the space by the pressure of the moderator pin. The moderator plate 13 has a nearly M-shape. A cover 10 covers the lower side opening of the case 1. Beneath the cover 10, there is a switch contact point 30 for electrically opening and closing by the rotation of the sliding element 5. The lever switch is composed in this structure.

It is a feature of the lever switch in this exemplary embodiment that its sliding surface 13C is a thin sheet deflected by pressure of the moderator pin, and is flexible, and that the moderator plate 13 has a nearly M-shape. The switch contact point 30 is disposed in the lower direction of the cover 10. The switch contact point 30 includes a holder 30a, a contact piece 30b, and a wiring board 30c.

Figure 4:
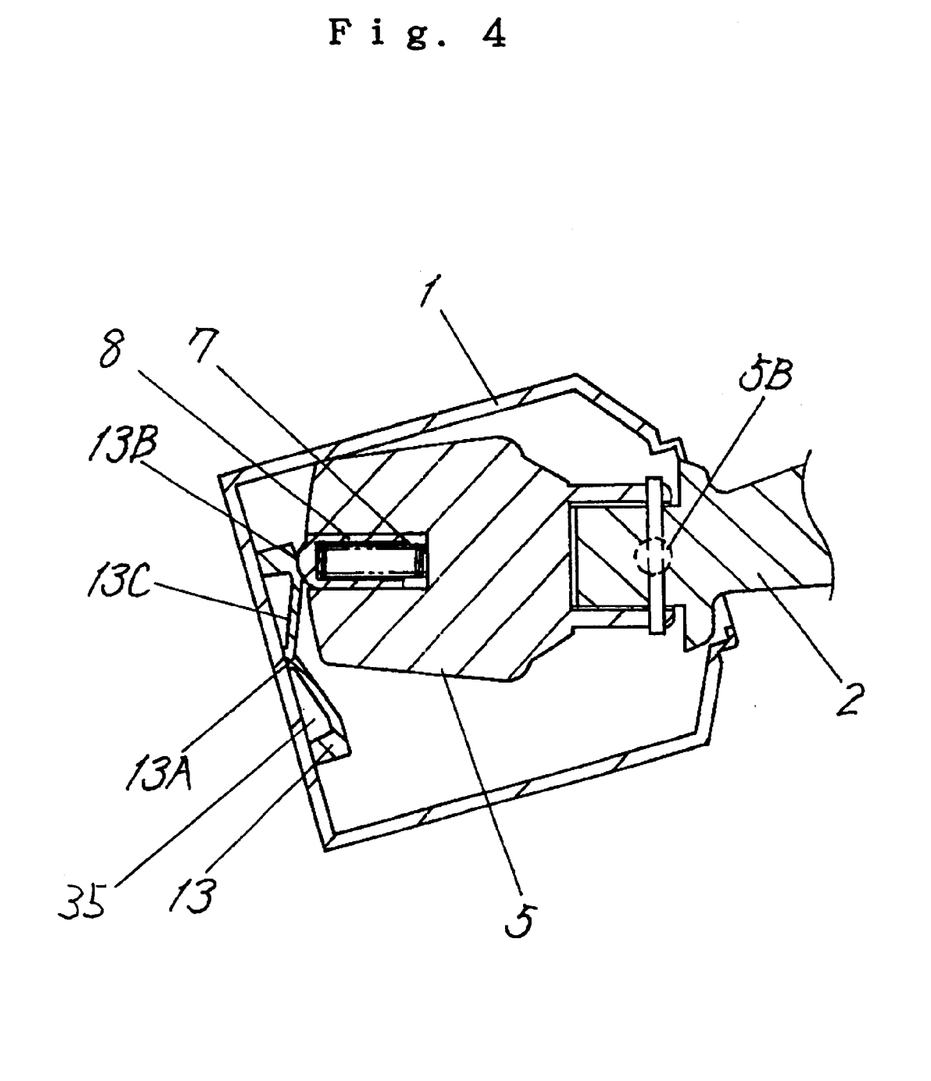
FIG. 4 is a plan sectional view in operation of the lever switch in the embodiment of the invention.

In this structure, when the operation lever 2 is manipulated in the lower direction from the neutral position shown in FIG. 1, the sliding element 5 rotates in the upper direction from the fulcrum of the shaft portion 5B supported on the case 1 as shown in a plan sectional view in FIG. 4. Accordingly, the moderator pin 8 being thrust to the coil spring 7 departs from the moderation ditch 13A of the moderator plate 13, and elastically slides on the sliding surface 13C. At this time, the sliding surface 13C is pressed by the moderator pin 8. Since the sliding surface 13C is thin and flexible, the sliding surface 13C is pressed in the direction of the left inner side wall of the case 1. As a result, the sliding surface 13C is slightly deflected toward the direction of the left inner side wall of the case 1.

Where the sliding element 5 contacts with the upper inner side wall of the case 1, the moderator pin 8 elastically slides from the sliding surface 13C to the moderation protrusion 13B. At this time, the deflection amount of the coil spring 7 changes. As a result, the operator feels a moderate sensation of manipulation when manipulating the operator lever 2. By such rotation of the sliding element 5, the switch contact point at the lower position is opened and closed electrically.

When the operation lever 2 is manipulated from the neutral position in the lower direction shown in FIG. 4, or when the operation lever 2 is returned from the upper direction to the neutral position, similarly, the moderator pin 8 slides elastically on the sliding surface 13C in the slightly deflected state, and then the moderator pin 8 elastically contacts on the moderation ditch 13A. Thus, the collision of the moderator pin 8 on the moderation ditch 13A is relaxed.

From the fulcrum of the through-hole 2B in which the shaft 6 is inserted, the operation lever 2 can be manipulated in both forward and backward directions. In this case, the ball 4 being thrust to the coil spring 3 elastically contacts with the sliding element 5. As a result, the operator feels a moderate sensation of manipulation. Further, by rotation of the operation lever 2, the switch contact point 30 at the lower position is opened and closed electrically.

Thus, according to this exemplary embodiment, the sliding surface 13C of the moderator plate 13 is thin and flexible. Therefore, when the moderator pin 8 slides elastically, the moderator plate is slightly deflected, and by this deflection, collision of the moderator pin 8 against the moderation ditch 13A is relaxed. As a result, the collision sound when manipulating the operation lever is suppressed, the operation is silent and a favorable sensation of manipulation is obtained.

In the exemplary embodiment, since the moderator plate 13 is made of an elastomer of low hardness, an excellent sensation of manipulation is obtained. However, the material of the moderator plate 13 is not limited to the elastomer alone, but other arbitrary resin materials may be used. For example, an ordinary plastic material having a higher hardness than the elastomer can be used. By using a plastic material having a higher hardness than the elastomer as the moderator plate, wear of the moderator plate in long-term use is decreased, and the long-term reliability of the lever switch is enhanced. Ordinary plastic materials include, for example, polyacetal, polyamide, polypropylene, and polyethylene. The moderator plate 13 may be also made of a material similar to that of the case 1. The moderation ditch 13A, moderation protrusions 13B, and sliding surface 13C are integrally formed. Or, at least one of the moderation ditch 13A, moderation protrusions 13B, and sliding surface 13C is made of a different material.

Exemplary Embodiment 2

Figure 5:
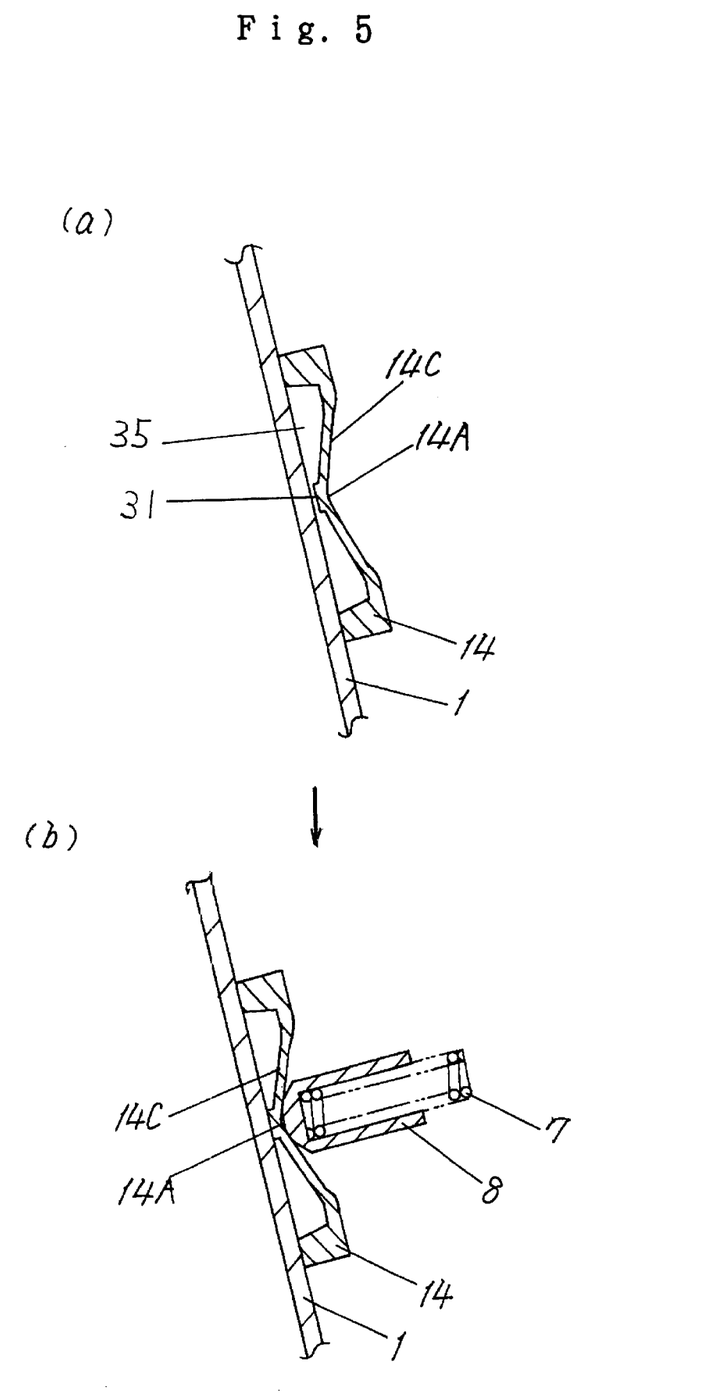
FIGS. 5(a) and 5(b) are an essential plan sectional view of a lever switch in other embodiment of the invention.

In the above exemplary embodiment 1, it is also possible to use a lever switch having a structure as shown in FIG. 5. FIG. 5 is an essential plan sectional view of a lever switch in other embodiment of the invention. In FIG. 5(a), a moderator plate 14 has a moderation ditch 14A and a sliding surface 14C. A predetermined gap 31 is formed between the back side of the moderator plate 14 and the inner side wall of the case 1. The other features are same as in exemplary embodiment 1. In such lever switch, as shown in FIG. 5(b), when the moderator pin 8 elastically contacts with the moderation ditch 14A, the sliding surface 14C and the moderation ditch 14A are deflected by the length of the predetermined gap 31 to the inner side wall of the case 1. Accordingly, the collision of the moderator pin 8 is relaxed, it is moreover silent when manipulating the operation lever.

Exemplary Embodiment 3

Figure 6:
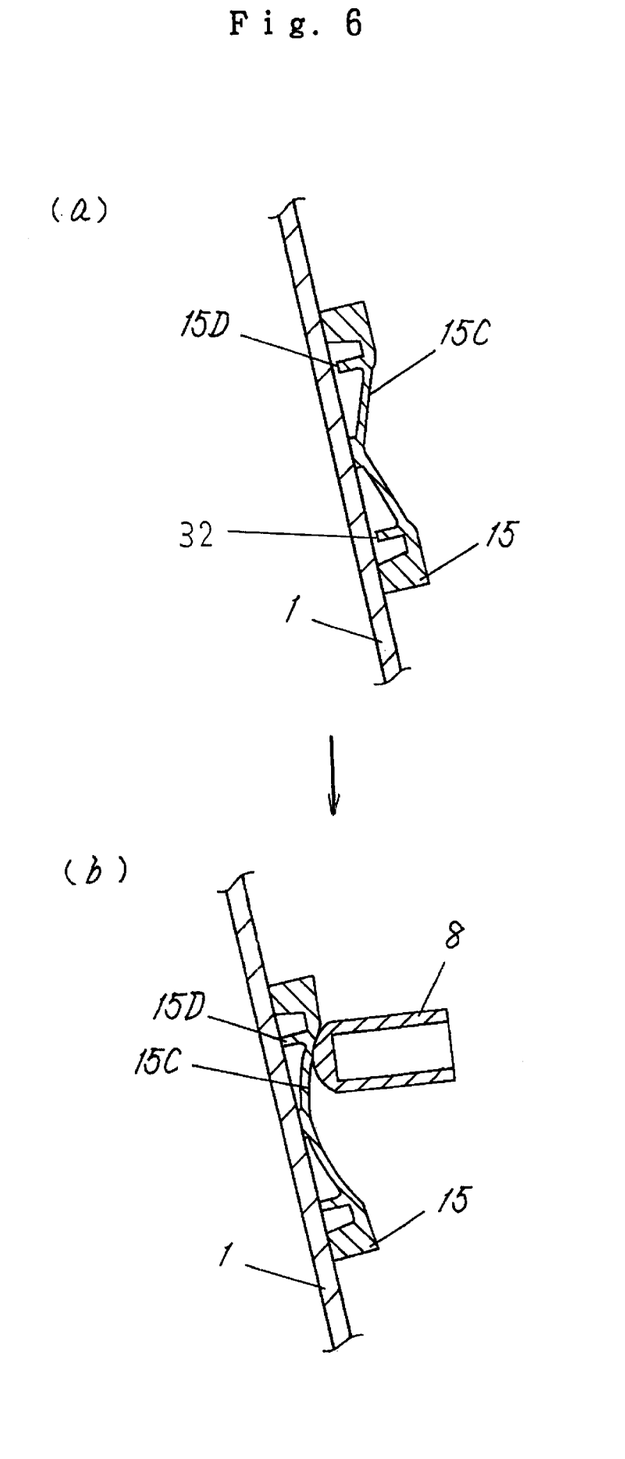
FIGS. 6(a) and 6(b) are an essential plan sectional view of a lever switch in a different embodiment of the invention.

In the above exemplary embodiment 1, it is also possible to use a lever switch having a structure as shown in FIG. 6. FIG. 6 is an essential plan sectional view of a lever switch in a different embodiment of the invention. In FIG. 6(a), a moderator plate 15 has a sliding surface 15C. Further, as shown in FIG. 6(a), a rib 15D is disposed at the back side of the sliding surface 15C, and this rib 15D protrudes toward the case 1. A predetermined gap 32 is formed between the rib 15D and the inner side wall of the case 1. As shown in FIG. 6(b), by varying the height of the rib 15D, it is possible to adjust the deflection of the sliding surface 15C when the moderator pin 8 presses the sliding surface 15C. Accordingly, if the sliding surface 15C is extremely thin, the stress resistance to deflection is improved. As a result, a favorable sensation of manipulation is maintained.

Exemplary Embodiment 4

Figure 7:
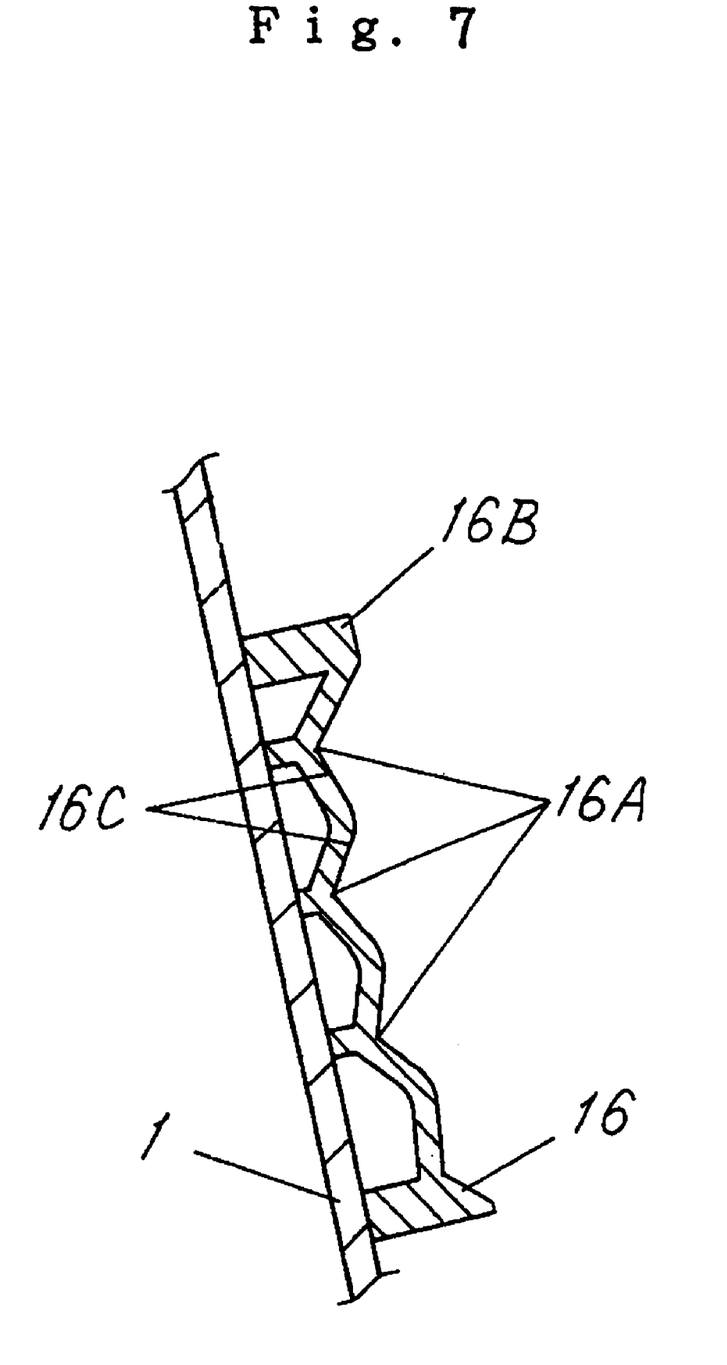
FIG. 7 is an essential plan sectional view of a lever switch in a further different embodiment of the invention.

In the above exemplary embodiment 1, it is also possible to use a lever switch having a structure as shown in FIG. 7. FIG. 7 is an essential plan sectional view of a lever switch in the different embodiment of the invention. In FIG. 7, a moderator plate 16 has a plurality of moderation ditches 16A, moderation protrusions 16B, and sliding surfaces 16C. The sliding surfaces 16C are disposed at both sides of each moderation ditch of the plurality of moderation ditches. The sliding surfaces are thin sheets so as to be deflected by the pressure of the moderator pin. In this structure, it is possible to manipulate at a plurality of positions, and the same effects as in exemplary embodiment 1 are obtained, and a favorable sensation of manipulation can be obtained.

Exemplary Embodiment 5

In the foregoing exemplary embodiments, the moderator plate 13 is disposed in the inner wall of the case 1, but not limited to this, other structures may be also possible. For example, the moderator plate 13 has the moderation ditch 13A, moderation protrusion 13B, and sliding surface 13C, and the sliding surface 13C has a thin portion. A space is formed at the back side of the sliding surface 13C. A plate is disposed at the back side of the moderator plate 13, and the back side of the moderation ditch 13A contacts or is bonded with the plate. Alternatively, a gap is formed between the back side of the moderation ditch 13A and the plate. In the case of the gap formed between the back side of the moderation ditch 13A and the plate, when the moderator pin 8 pushes the face side of the moderation ditch 13A, the sliding surface 16C is deflected, and the back side of the moderation ditch 13A contacts with the plate and is stopped. Or, as shown in exemplary embodiment 3, in the case of the rib 15D formed at the back side of the sliding surface 16C, when the moderator pin 8 pushes the face side of the sliding surface 16C, the sliding surface 16C is deflected, and the rib 15D contacts with the plate and is stopped. In such structures, the same effects as in the foregoing exemplary embodiments are obtained. It, however, adds the cost for installing the plate. The material of the plate is not particularly limited, and the plate is either hard or soft. If the plate is soft, when the moderator pin 8 pushes the moderation ditch 13A, the moderation ditch pushes the plate, and this soft plate receives this pressure softly.

Exemplary Embodiment 6

Figure 8:
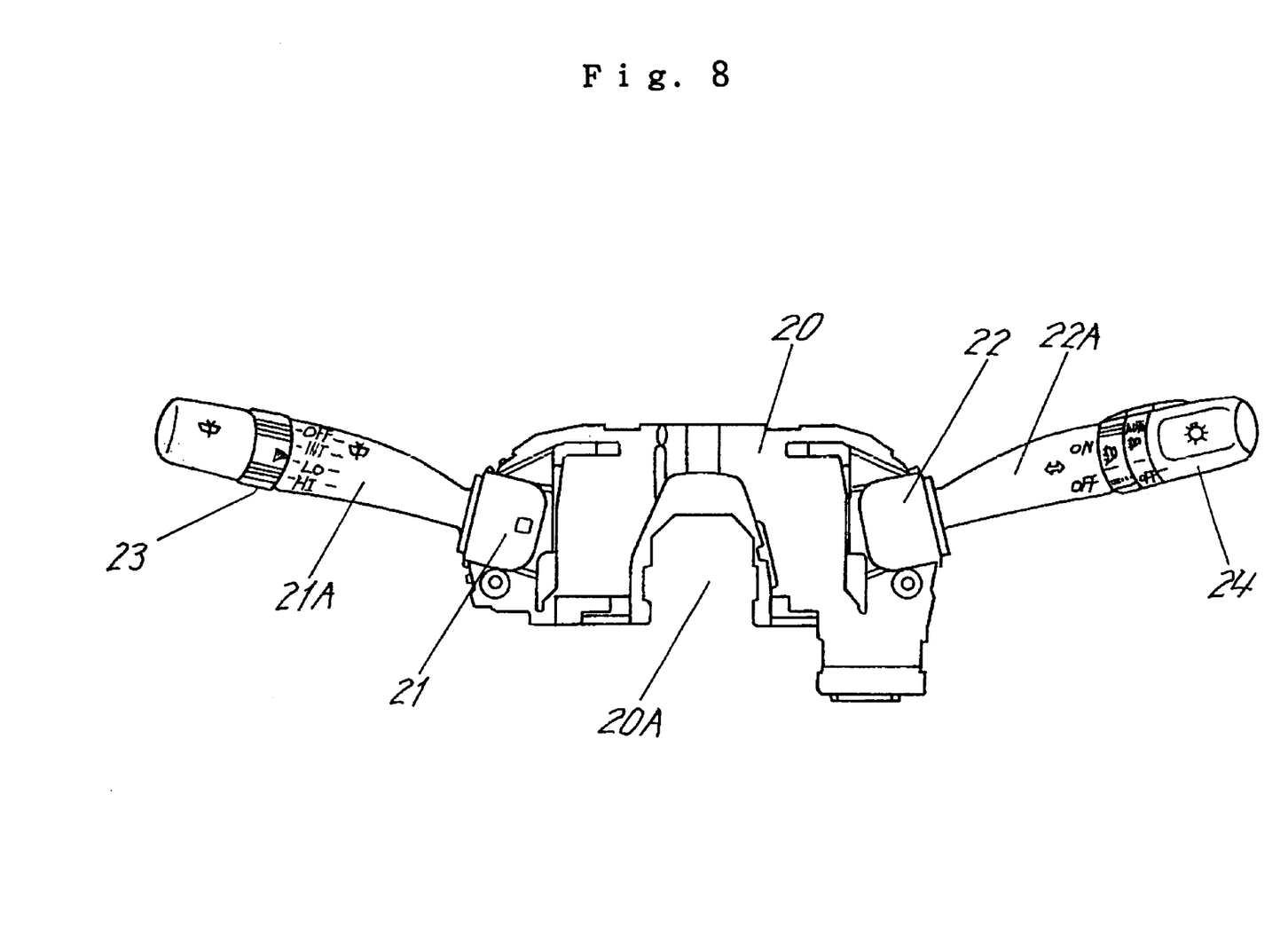
FIG. 8 is a plan sectional view of a compound switch in the embodiment of the invention.

FIG. 8 is a plan sectional view of a compound switch in an exemplary embodiment of the invention. FIG. 8 shows an example of using the lever switch of the invention in an automobile. In FIG. 8, the compound switch comprises a first lever switch 21 and a second lever switch 22. The first lever switch 21 has a function of changing over a washer motor and a wiper motor. The second lever switch 22 has a function of changing over the headlights and the turn signal. The first lever switch 21 and second lever switch 22 are contained in a housing 20 disposed in the vehicle. The housing 20 has an opening 20A formed in its center. A steering wheel shaft (not shown) of the vehicle is inserted in the opening 20A. The first lever switch 21 is disposed at the left side of the housing 20, and the second lever switch 22 is disposed at the right side of the housing 20.

These lever switches 21, 22 are disposed radially from the center of rotation of the steering wheel. The lever switches of the first lever switch 21 and second lever switch 22 have the same structure as the lever switches explained in the exemplary embodiments 1, 2, 3, and 4.

A rotary switch 23 for changing over the intermittent time of the intermittent operation of the wiper is disposed at the leading end of the operation lever 21A of the first lever switch 21. A rotary switch 24 for changing over the headlights and small lights is provided at the leading end of the operation lever 22A of the second lever switch 22.

In this structure, when the first lever switch 21 is manipulated in the vertical direction, the operation of the wiper is changed over in intermittent operation, low speed operation, and high speed operation. When the first lever switch 21 is manipulated in the longitudinal direction, the washer liquid is ejected.

When the second lever switch 22 is manipulated in the vertical direction, the turn signal for direction indication is changed over. When the second lever switch 22 is manipulated in the longitudinal direction, the illuminating range of the headlights is changed. In either case, as explained in the exemplary embodiments 1, 2, 3, and 4, the collision sound is suppressed when manipulating the lever switch, and silent operation is realized. At the same time, a favorable manipulation with a moderate sense is possible.

Thus, the compound switch of the exemplary embodiment has a plurality of lever switches disposed radially from the center of rotation of the steering wheel of a vehicle. Accordingly, multiple functions are exhibited. Further, generation of the sound due to manipulation of lever switch is suppressed. The operation is silent. A favorable sensation of manipulation is obtained.

In the foregoing explanation, the operation lever is manipulated manually, but not limited to this, the operation lever can be turned automatically. For example, if the second lever switch 22 is used for changing over the turn signal for direction indication, the manipulation from neutral position to vertical direction is done manually by the driver, and the restoration from the vertical direction to the neutral position may be done automatically by a cam or the like provided in the shaft of the steering wheel.

When the lever switch is operated automatically by the came or the like, the sliding element 5 turns instantly, and generally the moderator pin 8 collides hard against the moderation ditch, and the collision sound is loud. By using the lever switch in the exemplary embodiment, such collision sound is substantially suppressed. That is, the reduction of sound level when the lever switch is operated automatically is more significant than the reduction of sound level when the lever switch is manipulated manually. Thus, when the lever switch is operated automatically by the cam or the like, the effect of lowering the collision sound by manipulation of lever switch is further enhanced.

Thus, according to the invention, the sound level is lowered when manipulating the lever switch. Further, a lever switch having a favorable sensation of manipulation is obtained.

What is claimed is:

1. A lever switch comprising:
   (a) a case having an opening and an inner wall,
   (b) a sliding element rotatably provided in said case,
   (c) an operation lever coupled to said sliding element, and protruding from said opening,
   (d) a moderator pin disposed in said sliding element,
   (e) a moderator plate disposed on said case,
      in which said moderator plate is disposed at a position where a leading end of said moderator pin elastically contacts with said moderator plate,
      said moderator plate has a moderation ditch in a concave shape, moderation protrusions positioned at a first end and a second end of said moderation ditch, and a sliding surface linking said moderation ditch and moderation protrusions,
      a space is formed at a back side of said sliding surface, and
      said sliding surface has a thin portion so as to be deflected toward said space by pressure of said moderator pin, and
   (f) a switch contact point,
   wherein when said operation lever is manipulated, while said sliding element is rotating,
   the leading end of said moderator pin slides on the surface of said moderation protrusions, sliding surface, and moderation ditch,
   said sliding surface is deflected by the pressure of said moderator pin, and
   at the same time, said switch contact point opens or closes electrically depending on the rotation of said sliding element.

2. The lever switch of claim 1, wherein said moderator plate has a nearly M-shape.

3. The lever switch of claim 1,
   wherein said moderator plate is held in the inner wall of said case, and
   a space is formed between said sliding surface and inner wall.

4. The lever switch of claim 1, further comprising a plate disposed in said case,
   wherein said moderator plate is held on said plate, and
   a space is formed between said sliding surface and said plate.

5. The lever switch of claim 1,
   wherein a predetermined gap is formed at a back side of said moderation ditch, and
   when the operation lever is manipulated, the back side of said moderation ditch is deflected toward said gap by the pressure of said moderator pin.

6. The lever switch of claim 1,
   wherein a predetermined gap is formed at the back side of said sliding surface,
   said moderator plate has a rib protruding from the back side of said sliding surface, and
   when the operation lever is manipulated, the back side of said sliding surface is deflected toward said gap by the pressure of said moderator pin.

7. The lever switch of claim 1,
   wherein said moderator plate has a plurality of moderation ditches and a plurality of sliding surfaces, each of said plurality of moderation ditches having a sliding surface disposed at both sides thereof, and
   said each sliding surface comprising a thin portion so as to be deflected by the pressure of said moderator pin.

8. The lever switch of claim 1, further comprising:
   (g) a first spring installed at another end of said sliding element,
      in which said sliding element has a hole,
      said first spring is disposed in a deflected state in said hole,
      said moderator pin is thrust by said first spring, and
   (h) a second spring and a ball disposed between one end of said sliding element and said operation lever,
      in which said ball is thrust by said second spring, and
      said operation lever rotatably is fitted to said sliding element through said ball,
   wherein said sliding element rotates through said ball by manipulation of the operation lever, and
   along with rotation of the sliding element, the moderator pin slides on the surface of the moderator plate while pushing the moderator plate by the pressure of said first spring.

9. A vehicle using the lever switch of claim 1.

10. A lever switch comprising:
    (a) a case having an opening and an inner wall,
    (b) a sliding element rotatably provided in said case,
       in which said sliding element has a hole,
    (c) an operation lever coupled to said sliding element, and protruding from said opening,
    (d) a moderator pin and a spring disposed in said sliding element,
       in which said spring is disposed in a deflected state in said hole,
       said moderator pin is movably contained in said hole in a state of pressing said spring, and
       a leading end of said moderator pin protrudes from said hole,
    (e) a moderator plate disposed on said case,
       in which said moderator plate being held in the inner wall of said case,
       said moderator plate is disposed at a position where the leading end of said moderator pin elastically contacts with said moderator plate,
       said moderator plate has a moderation ditch in a concave shape, moderation protrusions positioned at a first end and a second end of said moderation ditch, and a sliding surface linking said moderation ditch and said moderation protrusions,
       a space is formed at a back side of said sliding surface,
       said sliding surface has a thin portion so as to be deflected toward said space by pressure of said moderator pin, and
       said moderator plate has a nearly M-shape, and
    (f) a switch contact point,
    wherein when said operation lever is manipulated, while said sliding element is rotating,
    the leading end of said moderator pin slides on a surface of said moderation protrusions, said sliding surface, and said moderation ditch,
    said sliding surface is deflected by the pressure of said moderator pin, and at the same time, said switch contact point opens or closes electrically depending on the rotation of said sliding element.

11. The lever switch of claim 10, wherein said spring is a coil spring.

12. The lever switch of claim 10,
wherein a predetermined gap is formed between a back side of said moderation ditch and the inner wall of said case, and
when the operation lever is manipulated, the back side of said moderation ditch contacts with the inner wall of said case by the pressure of said moderator pin.

13. The lever switch of claim 10,
wherein said moderator plate has a rib protruding from the back side of said sliding surface,
a predetermined gap is formed between said rib and the inner wall of said case, and
when the operation lever is manipulated, the rib contacts with the inner wall of said case by the pressure of said moderator pin.

14. A compound switch comprising:
(a) a housing, and
(b) a plurality of lever switches contained in said housing, wherein each of the lever switches includes:
   (1) a case having an opening and an inner wall,
   (2) a sliding element rotatably provided in said case,
   (3) an operation lever coupled to said sliding element, and protruding from said opening,
   (4) a moderator pin disposed in a hole of said sliding element,
   (5) a moderator plate disposed in said case,
      in which said moderator plate is disposed at a position where a leading end of said moderator pin elastically contacts with said moderator plate,
      said moderator plate has a moderation ditch in a concave shape, moderation protrusions positioned at a first and a second end of said moderation ditch, and a sliding surface linking said moderation ditch and said moderation protrusions, and
      said sliding surface has a thin portion so as to be deflected by pressure of said moderator pin, and
   (6) a switch contact point,
   wherein when said operation lever is manipulated, while said sliding element is rotating,
   the leading end of said moderator pin slides on a surface of said moderation protrusions, sliding surface, and moderation ditch,
   said sliding surface is deflected by the pressure of said moderator pin, and
   at the same time, said switch contact point opens or closes electrically depending on the rotation of said sliding element.

15. The compound switch of claim 14,
wherein said lever switches further having springs individually,
said sliding element has said hole,
said spring is disposed in a deflected state in said hole,
said moderator pin is movably disposed in said hole in a state being pressed by said spring,
a leading end of said moderator pin protrudes from said hole,
said moderator plate has a nearly M-shape, and
said moderator plate is held on the inner wall of said case.

16. A vehicle using the compound switch of claim 14.

17. A vehicle comprising:
(a) a steering wheel having a shaft,
(b) a housing disposed at an outer side of said shaft, and
(c) a plurality of lever switches disposed protruding from said housing, wherein each lever switch of said plurality of lever switches includes:
   (1) a case having an opening and an inner wall,
   (2) a sliding element rotatably provided in said case,
   (3) an operation lever coupled to said sliding element, and protruding from said opening,
   (4) a moderator pin disposed in a hole of said sliding element, and having a leading end of the moderator pin projecting from said hole,
   (5) a moderator plate disposed in said case,
      in which said moderator plate is disposed at a position where the leading end of said moderator pin elastically contacts with said moderator plate,
      said moderator plate has a moderation ditch in a concave shape; moderation protrusions positioned at a first end and a second end of said moderation ditch, and a sliding surface linking said moderation ditch and moderation protrusions, and
      said sliding surface has a thin portion so as to be deflected by pressure of said moderator pin, and
   (6) a switch contact point,
   wherein when said operation lever is manipulated, while said sliding element is rotating,
   the leading end of said moderator pin slides on a surface of said moderation protrusions, sliding surface, and moderation ditch, said sliding surface is deflected by the pressure of said moderator pin, and
   at the same time, said switch contact point opens or closes electrically depending on the rotation of said sliding element.

18. The vehicle of claim 17, wherein said plurality of lever switches are disposed radially from a center of rotation of said steering wheel.

19. The vehicle of claim 17,
wherein said lever switches further having springs individually,
said spring is disposed in a deflected state in said hole of said sliding element,
said moderator pin is movably disposed in said hole in a state being pressed by said spring,
the leading end of said moderator pin protrudes from said hole, said moderator plate has a nearly M-shape, and
said moderator plate is held in the inner wall of said case.

20. The vehicle of claim 17,
wherein each of the lever switches has a function of changing over at least one operation selected from the group consisting of headlight operation, turn signal operation, wiper operation, and washer motor operation.

21. A lever switch comprising:
(a) a case having an opening,
(b) a sliding element provided in said case,
(c) an operation lever coupled to said sliding element and protruding from said opening,
(d) a moderator pin disposed in said sliding element,
(e) a moderator plate disposed in said case, said moderator plate being disposed at a position where a leading end of said moderator pin elastically contacts with said moderator plate,
   said moderator plate having a moderation ditch having a concave shape, moderation protrusions positioned at a first end and a second end of said moderation ditch, and a sliding surface coupling said moderation ditch and moderation protrusions, and said sliding surface capable of being deflected by pressure of said moderator pin, and (f) a switch contact point, wherein the leading end of said moderator pin slides on a surface of said moderation protrusions, the sliding surface, and the moderation ditch; said sliding surface being deflected by the pressure of said moderator pin, and said switch contact point opens or closes electrically depending on the position of modulator pin on said modulator plate.

22. The lever switch of claim 21, wherein said moderator plate comprises a substantially M-shape configuration.

23. The lever switch of claim 21, wherein a predetermined gap is formed at a back side of said moderation ditch, and when the operation lever is manipulated, the back side of said moderation ditch is deflected toward said gap by the pressure of said moderator pin.

24. The lever switch of claim 21, wherein a predetermined gap is formed at the back side of said sliding surface, and when the operation lever is manipulated, the back side of said sliding surface is deflected toward said gap by the pressure of said moderator pin.

\* \* \* \* \*